(12) United States Patent
Baum (10) Patent No.: US 7,343,417 B2
(45) Date of Patent: Mar. 11, 2008

(54) SYSTEM AND METHOD FOR RATING MEDIA INFORMATION

(75) Inventor: Felix Baum, Oakland, CA (US)

(73) Assignee: Knowledge Networks, Inc., Menlo Park, CA (US)

( * ) Notice: Subject to any disclaimer, the term of this patent is extended or adjusted under 35 U.S.C. 154(b) by 636 days.

(21) Appl. No.: 09/997,218

(22) Filed: Nov. 30, 2001

(65) Prior Publication Data

US 2003/0105870 A1      Jun. 5, 2003

(51) Int. Cl.
*G06F 15/16* (2006.01)
(52) U.S. Cl. .................................. 709/228; 709/229
(58) Field of Classification Search ............. 709/229, 709/228, 230; 725/34; 711/118; 705/14, 705/1; 370/355
See application file for complete search history.

(56) References Cited

U.S. PATENT DOCUMENTS

| | | | | |
|---|---|---|---|---|
| 5,754,787 A | * | 5/1998 | Dedrick | 709/228 |
| 6,064,980 A | * | 5/2000 | Jacobi et al. | 705/26 |
| 6,112,181 A | * | 8/2000 | Shear et al. | 705/1 |
| 6,385,693 B1 | * | 5/2002 | Gerszberg et al. | 711/118 |
| 6,571,216 B1 | * | 5/2003 | Garg et al. | 705/14 |
| 6,697,824 B1 | * | 2/2004 | Bowman-Amuah | 709/229 |
| 6,760,916 B2 | * | 7/2004 | Holtz et al. | 725/34 |
| 6,772,139 B1 | * | 8/2004 | Smith, III | 707/3 |
| 2003/0002490 A1 | * | 1/2003 | Wong et al. | 370/355 |
| 2003/0014320 A1 | * | 1/2003 | Thompson et al. | 705/26 |

OTHER PUBLICATIONS

U.S. Appl. No. 09/740,515, filed Jun. 20, 2002, Felix Baum.

* cited by examiner

*Primary Examiner*—William Vaughn
*Assistant Examiner*—Thanh Tammy Nguyen
(74) *Attorney, Agent, or Firm*—Buchanan Ingersoll & Rooney PC (57) ABSTRACT

A system for obtaining a rating stream of information concerning a media presentation is described. The client unit provides a media player. In a preferred embodiment, the client unit also provides a rating indication display. The rating can be adjusted by the user. The rating information, along with time stamp information recorded when the rating changes, is provided from the client unit to a data collection unit. The analysis unit requests data from the data collection unit, and combines the ratings information from multiple users. In a preferred embodiment, the analysis unit combines the rating information according to demographic groups based on the demographic profiles of the users.

24 Claims, 5 Drawing Sheets

SYSTEM AND METHOD FOR RATING MEDIA INFORMATION

BACKGROUND OF THE INVENTION

In many situations, it is desirable to produce a rating stream concerning a media presentation. One example of such a presentation is the presidential debates. It is very useful for news organizations and other groups to have an understanding of how the public feels about the different events that occur during a debate.

One way of obtaining such information is to show a presidential debate to a roomful of people. During the presidential debate, the people in the room can be provided with a knob that they adjust to indicate how they feel about the different events that occur during the presidential debate. The collected information thus gives some indication of how the public feels about the debate. The public's approval or disapproval at different points in the debate can be newsworthy.

A downside of this system is that such systems do not tend to provide an accurate representation of the opinion of the public at large, since the people in the room tend not to be a representative sample of the public. The members of the panel tend to be from a single area. Additionally, the sample size tends to be far too small to provide an accurate understanding of the public's approval or disapproval of different events that occur during the presentation.

It is desired to have an improved method of getting a rating information concerning a media presentation that more accurately reflects the opinions of the public.

SUMMARY OF THE INVENTION

The present invention is a method of producing rating data over a network, such as the Internet. By obtaining the stream of rating data across the network, a variety of users from a large geographic area can be polled. In a preferred embodiment, demographic data concerning the users is obtained before or after the polling. The resulting data can more accurately reflect the response of the target population, such as the public at large. The demographic data allows ratings for different groups to be measured.

In a preferred embodiment, demographic data is collected for each user. The demographic data allows ratings for different demographic sections of the user base to be produced. In a preferred embodiment, demographic data is collected from the target population such as the public at large.

In one embodiment, weights are used to weight the inputs of the different users to more accurately reflect the demographic profile of the target population, such as the public at large.

One embodiment of the present invention is a method of obtaining demographic data concerning users, the demographic data including data for a number of profile categories, producing a media and rating indication display at a client unit, the rating information display indicating a user's rating of an element in the media. At the client unit, receiving rating information from a user and transmitting the rating information to a server across a network, selecting at least one indication for at least one profile category to determine a grouping of multiple users at an analysis unit, and combining the rating information from the multiple users.

Another embodiment of the present invention concerns the synchronization of a media, such as a video stream, with the users' ratings. For events, such as a debate, the synchronization of the video with the rating stream is crucial. If the systems are not synchronized, users will appear to be rating one event during the debate when, in fact, they are rating another event during the debate. This can make the results useless.

In one embodiment, the clock at the client unit is used to time-stamp rating information. One way of trying to get a synchronization is to rely upon the normal time synchronization of a client unit. Typically, the client unit gets its clock synchronized from a central server. The applicant has found, in many cases, that it is not desirable to rely upon this synchronization. Even with this typical clock synchronization, among the different client units in the country, there can be significant variation. In the method of the present invention, a server provides a time indication to a client at a first time. The client receives the data, concerning the event, at a second time. The client or server is adapted to produce a difference indication of the difference between the first and second time. If the client produces the difference indication, the client transmits the data, such as the rating data, along with the time indication and the difference indication to the server across the network. The client could alternately send information to the server that allows the server to calculate the differential value. The differential value can be added to the indication sent to the client by the central server. In an alternate embodiment, client-based clocks without server synchronization can be used if the client-based clocks can be assured to be sufficiently accurate.

DETAILED DESCRIPTION OF THE PREFERRED EMBODIMENT

Figure 1:
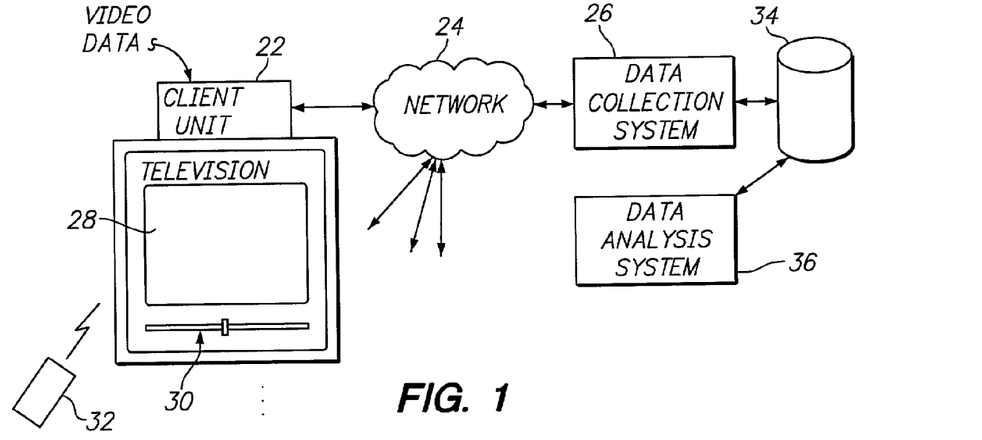
FIG. 1 is a diagram of a system of one embodiment of the present invention.

FIG. 1 illustrates the system of one embodiment of the present invention. In this embodiment, a client unit 22 is connected to a network 24 so that it can receive data from data-collection system 26. In one embodiment, the network 24 is the Internet and the data-collection system 26 is a web server. In a preferred embodiment, the client unit 22 is able to combine web-based data with media-based data. The media data can be from a T.V. antenna, cable, video player, DVD player, digital video player or any other system. The media stream can originate from a stereo, single-cast, multicast or broadcast source. In one embodiment, the client unit 22 is a WebTV™ unit available from Microsoft.

In a preferred embodiment, the respondent goes to a web page, in which web page information is provided from the web server 26 across the Internet to the client unit 22. The client unit 22 has a display including a media display area 28 and displays information derived from the web information. The display preferably includes an indication of a rating, such as the rating bar 30. Additional information provided includes messages, labeling for the rating bar and the like. A remote control unit 32 is preferably used to send signals to the client unit 22, to cause the rating bar to move to a desired position. During the presentation, the respondent preferably uses a remote to move the rating bar to the desired position. Time-stamped rating information is cached locally and then sent to the web server 26.

Although a WebTV™ client box is described, it is known that any other client unit, having the required functionality, can be used with the methods and apparatus of the present invention. The web server 26 preferably stores the user-client data in a database 34. In one embodiment, a data analysis system 36 analyzes the data from the users to provide a graphical indication of how the public and different groups of the public rate the presentation. In one embodiment, the system components include a data collection system to collect raw data, a data preparation subsystem to summarize and do optional weighting of the data, data display subsystem, and data analysis subsystem. The data analysis subsystem allows manipulation of the views of the data and in one embodiment includes a query tool, media player controls and zoom functions.

Figure 2:
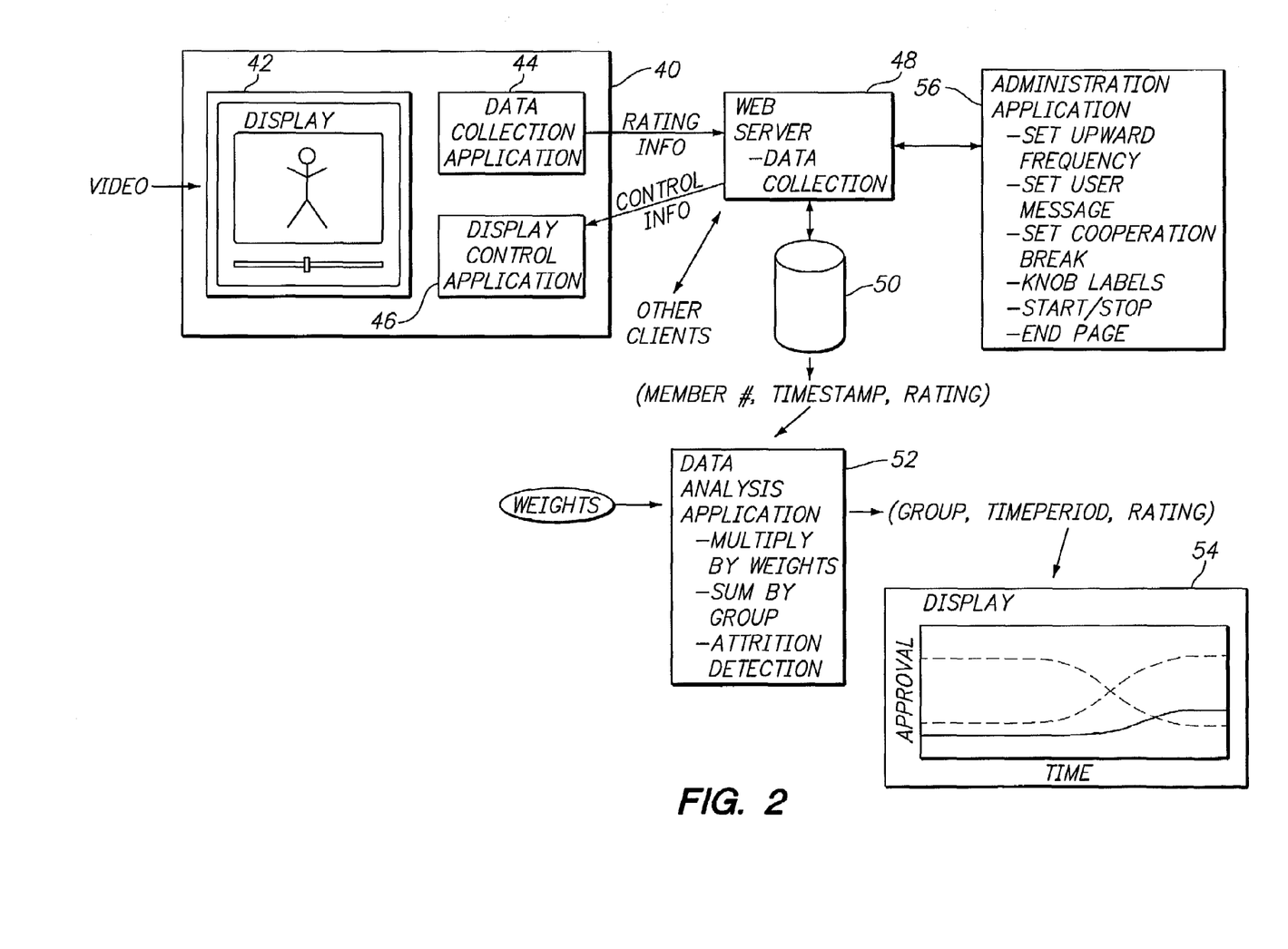
FIG. 2 is a diagram of a system of one embodiment of the present invention.

FIGS. 2-6 below describe a preferred ratings stream method for use with the present invention. FIG. 2 illustrates one embodiment of the present invention. The client unit 40 includes a display 42; a data collection application 44 running at the client, which collects and caches the rating data to be provided to the web server; and a display control application 56 which is used to change the display and the control information from the web server 48 to provide a display along with behaviour control characteristics for data collection application 44 and the media elements on display 42. The data is stored in a database 50. An example of the data stored includes the member identifier, rating information, and the time when this rating was selected by the user. The information from the database 50 can be analyzed using the database analysis application 52. In one embodiment of the analysis application, the rating information from the members can be multiplied by the weights for that member. The use of the weights can allow the ratings to more accurately represent the target demographic, such as the public. A description of a system that can be used to determine weights is described in patent application Ser. No. 09/740,515 filed Dec. 18, 2000, for "Survey Assignment Method," which is incorporated herein by reference. In one embodiment, the data analysis application 52 sums by group and determines the average and other statistics for a rating for different groups. In one embodiment, the data analysis application determines when members are paying attention or not paying attention to the presentation and, thus, are part or not part of the survey. In one embodiment, the weights are modified by the number of the people who are presently paying attention to the presentation. Alternately, the weights can be fixed for the entire presentation. The data obtained from the data analysis application includes data of the group identification time period and the rating. This information is displayed on display 54. Display 54 shows the average rating for a number of different groups. In one embodiment, display 54 includes a replay of the video presentation for easier understanding of the rating stream. Additionally, the web server 48 can be used in an administration application 56. The administration application controls the web page so as to set the upload frequency, set user messages set break indications for commercials and media changes, set the knob labels, start and stop the presentation and to provide the information for an end page.

In one embodiment, the web server is a system like Apache/Tomcat. In one embodiment, the analysis program is a Java program. In one embodiment, the display 54 is run in a separate web page, accessible by the administrator, or by the person to whom the administrator gives access to the page. In one embodiment, the database 50 is an Oracle database. A number of other alternatives could also be used rather than these exemplary embodiments.

Figure 3A:
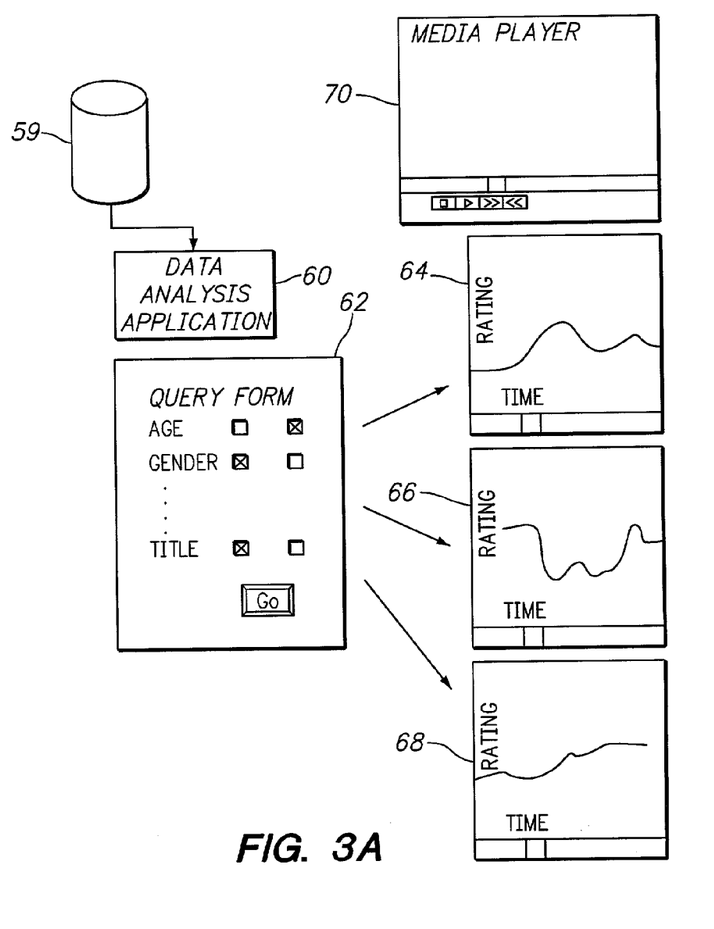
FIG. 3A is a diagram of a playback and data analysis system of one embodiment of the present invention.

FIG. 3A illustrates an offline data analysis system. The database 59 contains the data obtained from the client unit. The data analysis application 60 is used to analyze data. In this example, a query form 62 is provided to a user. The user selects different demographic information and selections, such as age, gender, political party or the like. The users and member identifiers are associated with different demographic data collected from the different members. By entering data on the query form, a desired set of characteristics is determined. When the user submits the data entered on the query form, the desired characteristics are used to determine which members, of the members doing the rating, fit the characteristics submitted. A rating box 64 is produced, indicating the ratings for the members with the desired characteristics. The query form could be submitted a number of different times, producing a number of different rating boxes 66 and 68. In one embodiment, the different rating boxes could be combined together by dragging one of the boxes on top of the other box. Additionally, a media player 70 can be used which synchronizes to display of the rating boxes. Thus, when the media player 70 is run, the different ratings also run. The system can be implemented offline using a PC-based system.

Figure 3B:
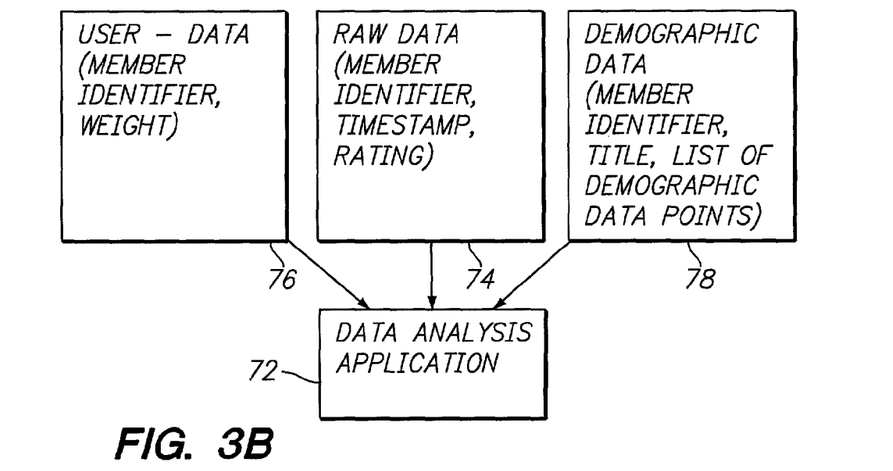
FIG. 3B is a diagram illustrating a data analysis application of one embodiment of the system of the present invention.

FIG. 3B is a diagram that illustrates the data analysis application 72. The data preferably includes the raw data 74, including the member identifier, the rating selected by the member, and the time stamp of when the rating is made by the member; the member data 76, including the member identifier and the weights for the members; and demographic data 78, which illustrates a group, such as Democrat, and most of the members who fit that group. In a preferred embodiment, demographic data is collected for a number of profile categories. The data analysis application 72 uses all three types of data in order to produce the visual display of the rating for combined group.

Figure 3C:
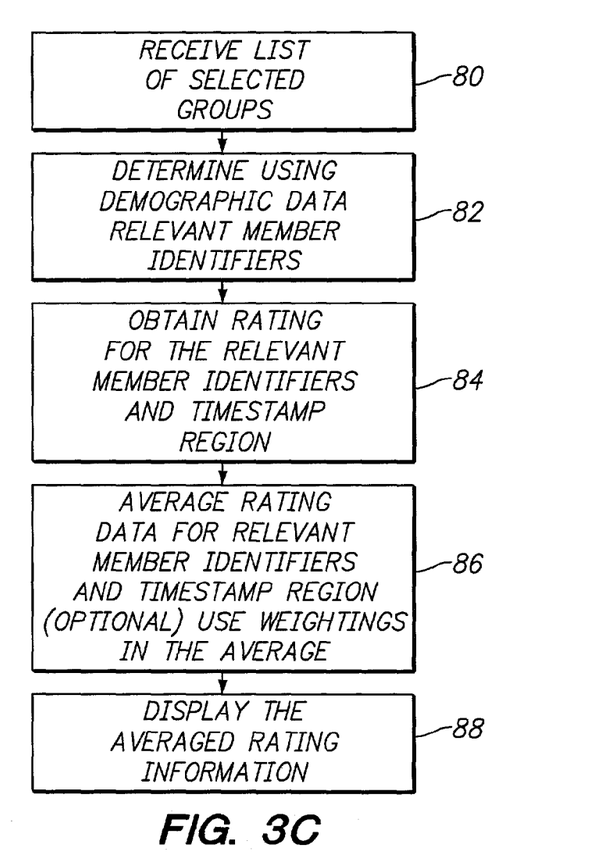
FIG. 3C is a flowchart illustrating the weighting and grouping functions of one embodiment of the system of the present invention.

FIG. 3C is flowchart that illustrates the system of one embodiment of the present invention. In step 80 a list of selected indications is obtained. These selected indications preferably relate to one or more profile characteristics. In step 82, using these selected indications, the relevant member identifiers are produced. The member identifiers can change during the presentation due to attrition. In step 84, the rating for the relevant member identifiers and timestamp intervals is obtained. In step 86, a combined rating is produced. In one embodiment, this combined rating is an average rating data for the relevant member identifiers and time stamps. Optionally, weighting is used in the production of the averages and other statistics. In step 88 the average rating information is displayed.

Figure 4:
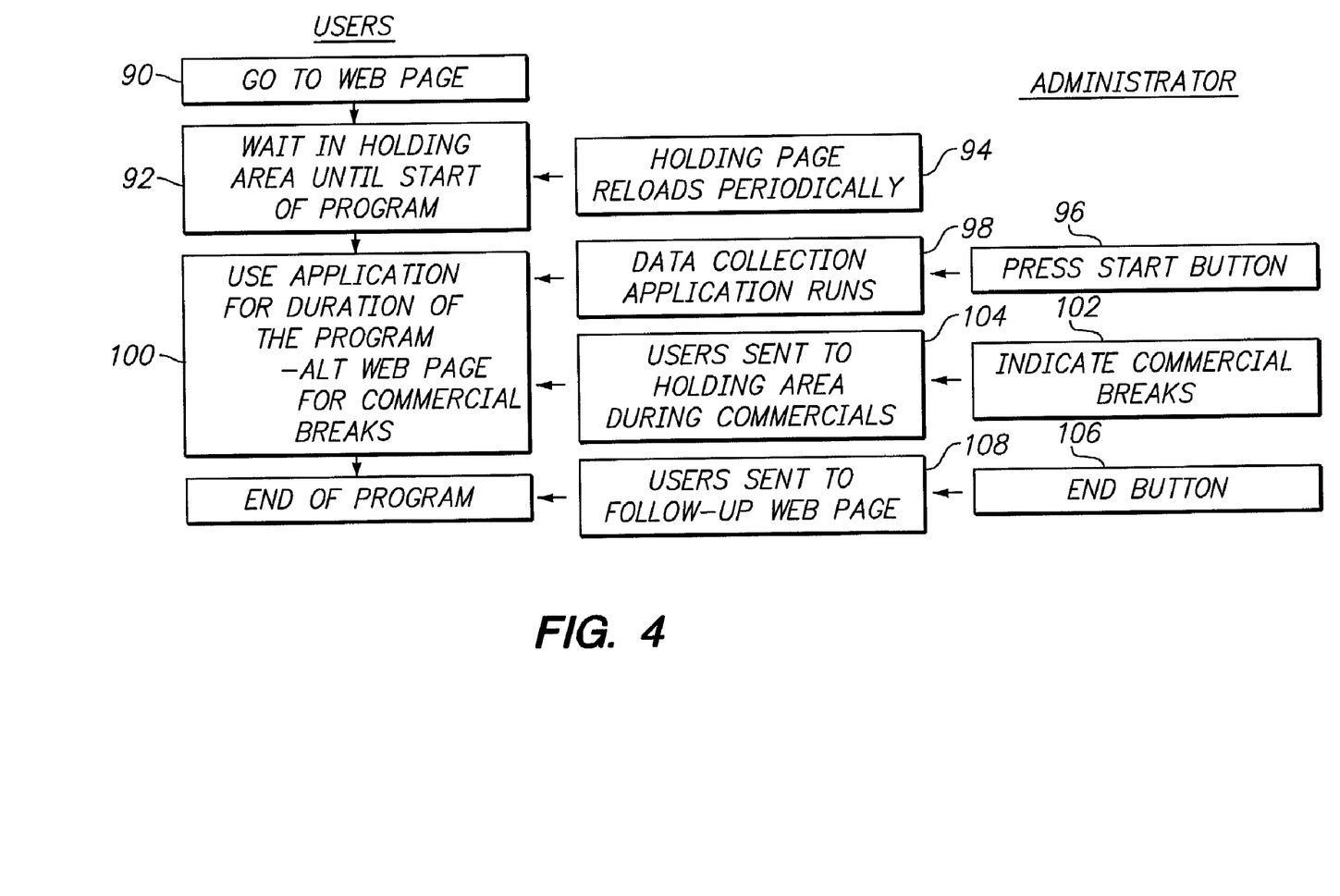
FIG. 4 is a diagram illustrating the operation of the system of the present invention using web pages.

FIG. 4 illustrates one embodiment of a web based interface for the current rating data collection. The users in step 90 go to a web page and are sent to a holding area in step 92 until the program starts. In step 94, the holding page information is reloaded periodically by the client unit. In step 96, the administrator presses the start button which causes the data application to run in step 98. The user can use the application for the duration of the program in step 100. The administrator in step 102 can indicate the commercial break or media change; the users are sent to a holding area during the commercial break or media change in step 104, and are returned when the commercial break or media change is complete. When the program ends, the administrator produces an end indication in step 100. This causes the users being sent to a follow-up web page 108, in which they can be queried with quiz questions or additional surveys. Additionally, in one embodiment, a similar web page queries the users during a commercial break or media change.

If the client is playing stored media information, such as from a DVD, the user will be able to start the media. The rating information will be collected throughout the duration of the media stream. No administrator is required to start and stop the user's rating experience.

Figure 5:
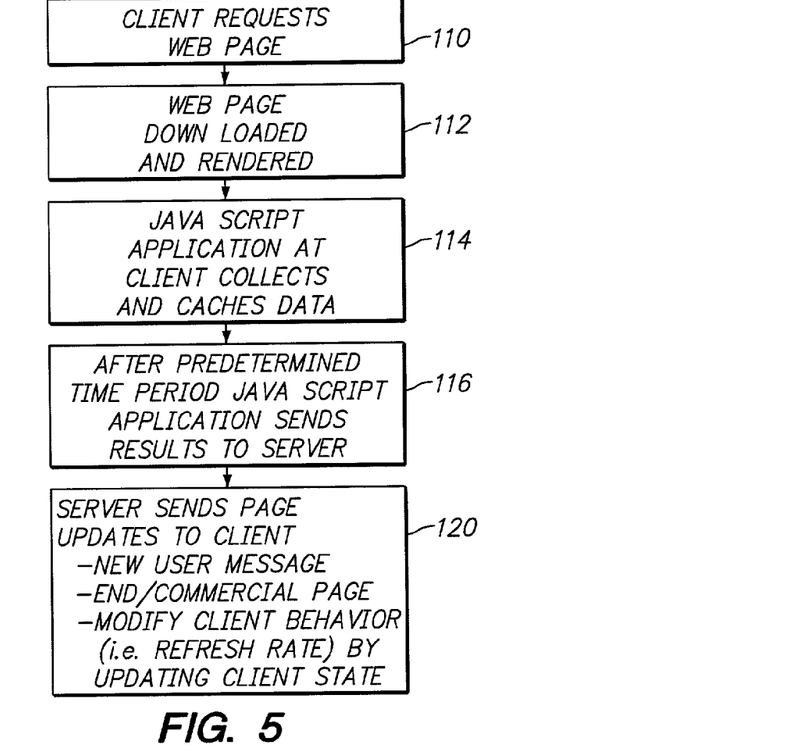
FIG. 5 is a flowchart illustrating the system of one embodiment of the present invention using web pages.

FIG. 5 is a flowchart that illustrates the system of one embodiment. In step 110, the client requests a web page. The web page is downloaded and rendered in step 112. Preferably, the web page includes the information causing the display, such as the rating bar display, as well as containing the application for collecting and caching rating information. In step 114, the application, such as the Javascript application, obtained from the web page, is run at the client, so that the client can collect and cache the rating data in step 116. After a predetermined time period, the Javascript application sends the rating results to the server. As described above, this rating information can also include time stamp information, preferably, as described below, with respect to FIGS. 6A-6C. In step 120 the server sends page updates to the client. The page can include new user messages and commercial pages can modify the client behavior; for example, the refresh rate of the cache, at the client, by updating the client state.

A problem that can occur with rating systems run over networks, such as the Internet, is that the clocks of the different client units fall out of sync. One example is the WebTV™ clocks, which are updated, every so often, from a central server. Typically, however, there is still a possibility of a significant discrepancy between different client units. This can be a tremendous problem for the rating system, if the rating system relies upon the internal clock of the client device. For example, looking at FIGS. 6A and 6B, in FIG. 6A, the time $T_0$ is given and the time of the event is also given. The client clock is a certain time period off from the centralized server clock of the rating system. If the time stamp is judged to be the clock of the client, looking at FIG. 6B, the time stamp for a certain event, $T_E$, will fall off from what the time of the event would be, according to the server clock.

Figure 6A:
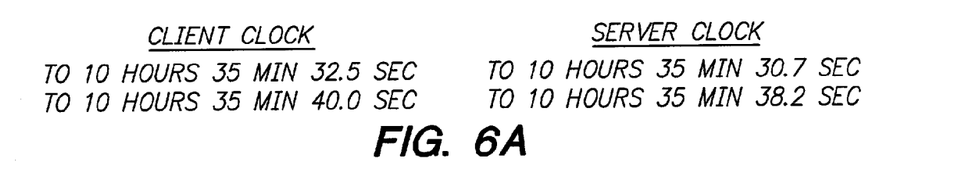
FIGS. 6A-6C is a diagram illustrating the time synchronization of one embodiment of the present invention.
Figure 6B:
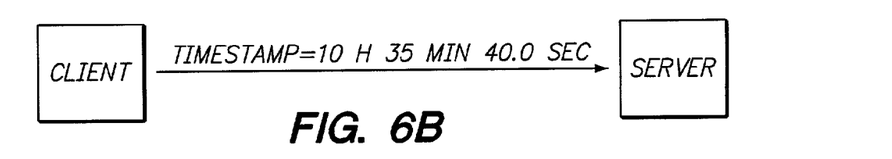
Figure 6C:
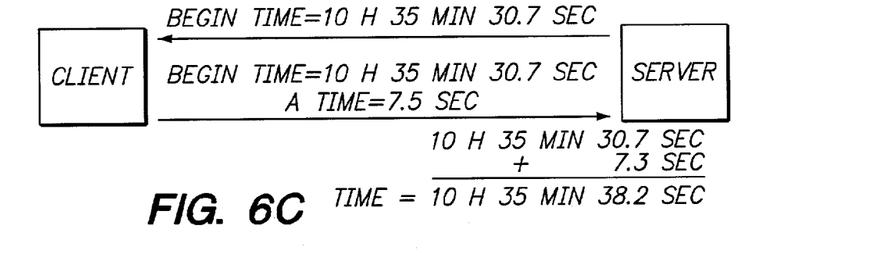

FIG. 6 illustrates a system of the present invention, in which the server provides a first indication, or begin time, for the client in its download. The application at the client begins at differential time, starting at this download, and the information sent to the server includes the begin time, which is provided by the server, along with the differential time. The differential time can be computed by determining the time from the receiving of the begin time from the server, until the time of the rating event. Alternately, the client can send information to the server that allows the server to calculate the differential time. At the server, the begin time and the differential time can be added to determine a more accurate event time. The differential time can be determined with respect to the client clock, or by a counter loop, implemented at the client. In one embodiment, the time synchronization occurs only when the time differential is above a threshold.

When a storage medium is used to store the media presentation, in a preferred embodiment, the media presentation includes a special sync event that occurs during the media presentation. The sync event may be the pont at which the user starts to play the stored media. Other sync points can be used as well. The user presses a button on the occurrence of the sync event. This information is then provided to the server, which can then figure out, for that member, the position of other events relative to the sync event. The media presentation can include a DVD, video tape or any other stored medium presentation.

Alternately, the sync signal can be contained in the broadcast media. For example, if a television program is broadcast at different times in different locations in the country, in one embodiment, the client unit uses a synchronization signal embedded in the broadcast to determine information concerning the synchronization. For example, the client unit can determine where in the program the user is watching or that a user has started to watch the program. More generally, the timing synchronization signal may also be embedded in the media stream. The client unit utilizes this signal to sync the timestamp of a rating indication or change.

In a preferred embodiment, the analysis application allows for the selection of groups of users, preferably based on profile category information, during and after the period of ratings data collection. In this manner, the grouping selection is not required to be made beforehand. This allows the analyst to interactively select the groupings to combine into the combined ratings. For example, the user's demographic profile information can be used to produce a grouping of users who are female Democrats from the Midwest. A combined rating steam for this grouping is preferably made by the analysis unit.

In a preferred embodiment, an administrative interface controls the behavior of client units. This allows the system to initiate and terminate the recordings of rating data as well as the rate at which the clients connect to the server to send the collected ratings data. By controlling the rate of ratings data sent between the client units and the server, the administrative interfaces can ensure that the servers are not flooded with data.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A computer-implemented method for rating media information by using a plurality of remotely located client units and a server connected to the client units via a network, each client unit being able to receive media information via a communication medium other than the network, comprising:

causing a user to view media information received by a client unit via the communication medium and displayed on the client unit;

transmitting to the client unit, via the network, indicator information enabling the client unit to display a rating indicator along with the media information to the user, to allow the user to control the rating indicator and thereby to input as a function of time rating information of events occurring at particular times in the media information and to transmit the rating information to the server via the network;

receiving the rating information transmitted from the client unit and storing the received rating information in a database;

transmitting to the client unit, via the network, a query form for demographic data enabling the client unit to display the query form to a user, to allow the user to input the demographic data and to transmit the demographic data via the network, the demographic data including information relating to a plurality of profile categories;

receiving the demographic data transmitted from the client and storing the received demographic data in the database;

listing the user in at least one group characterized by one or more of the profile categories;

combining the stored rating information of each user listed in the group to determine an average rating of the group; and displaying the average rating of the group as to the events as a function of time; further including: transmitting a time indication, via the network, to the client unit enabling the client unit to measure a time interval between the time indication and the time when the user inputs the rating information and to transmit information of the time interval along with the rating information via the network and wherein the time interval information is used to identify the event.

2. The method of claim 1 wherein one of the profile categories is gender.

3. The method of claim 1 wherein one of the profile categories is political party affiliation.

4. The method of claim 1, wherein the steps of listing, combining and displaying are performed by an analysis unit.

5. The method of claim 4, further comprising the step of displaying the media information along with the average rating on a visual display device.

6. The method of claim 1, wherein the steps of listing, combining and displaying are performed by the server.

7. The method of claim 1, wherein the source of the media information transmitted through the communication medium is selected from the group consisting of a television station, a cable operator, a video player, a DVD player, a single-cast source, a multi-cast source and a broadcast source.

8. The method of claim 1 wherein the media information is obtained from a storage medium.

9. The method of claim 1 wherein the network is the Internet.

10. The method of claim 9 wherein the client units obtain web page information through the Internet.

11. The method of claim 1 wherein the combining step includes weighting the stored rating information and thereby weighting the average rating.

12. The method of claim 11 wherein weights are used to make the average rating more accurately represent the rating of a target population.

13. The method of claim 12 wherein the target population is the general public.

14. The method of claim 1 wherein an administrative application program connected to the server controls a data transmission rate at which the rating information is transmitted from the client units to the server.

15. The method of claim 14 wherein the administrative application controls the data transmission rate by throttling the number of connections that reach the server per time period.

16. The method of claim 1 wherein an administrative application program associated with the server controls the start time and end time of ratings collection.

17. An apparatus for rating media information, comprising:

a plurality of client units, each including a video monitor for presenting, to a user, a rating indicator, media information and a query form for demographic data that includes information relating to a plurality of profile categories, each said client unit being operative to receive, via a network, indicator information to display the rating indicator, to receive, via a communication medium other than the network, the media information, and to receive, via the network, the query form, each said client unit being further adapted to allow the user to input as a function of time rating information of events occurring at particular times in the media information and the demographic data, and to transmit the rating information and the demographic data via the network to a server, the rating indicator indicating the user's rating of the events in the media information;

a server connected to the client units via the network and operative to send the indicator information and the query form to the client units, to receive, via the network, the rating information and the demographic data transmitted from the client units, and to store the rating information and the demographic data in a database;

an analysis unit associated with the server and having access to the demographic data and the rating information stored in the database, the analysis unit being adapted to list the user in at least one group characterized by one or more of the profile categories and to combine the rating information of each user listed in the group to determine an average rating of the group; and a display for displaying the average rating of the group as to the events as a function of time;

wherein the server is further operative to send a time indication, via the network, to each of the client units enabling each of the client units to measure a time interval between the time indication and the time when the user inputs the rating information and to transmit information of the time interval along with the rating information via the network and wherein the time interval information is used to identify the event.

18. The apparatus of claim 17 wherein the rating information stored in the database is weighted by the analysis unit.

19. The apparatus of claim 17 wherein the network is the Internet.

20. The method of claim 19 wherein the server provides web page information to the client units Via the network.

21. The method of claim 20 wherein the web page information includes an application program that is executable at the client units.

22. The method of claim 21 wherein the application program controls the storing and caching of the rating information in the client units, as well as the transmitting of the rating information to the server via the network.

23. The method of claim 17 wherein the source of the media information transmitted through the communication medium is selected from the group consisting of a television station, a cable operator, a video player, a DVD player, a single-cast source, a multi-cast source and a broadcast source.

24. The method of claim 17 wherein the analysis unit is adapted to produce a display of the average rating and the media information.

* * * * *